Aug. 4, 1931.   A. F. J. LAFKY   1,817,694
LUMINOUS FISHING SPOON
Filed Sept. 21, 1929

A. F. J. Lafky, INVENTOR.
BY
Geo. P. Kimmel
ATTORNEY.

Patented Aug. 4, 1931

1,817,694

UNITED STATES PATENT OFFICE

ALBERT F. J. LAFKY, OF SALEM, OREGON

LUMINOUS FISHING SPOON

Application filed September 21, 1929. Serial No. 394,270.

This invention relates to a luminous fishing spoon adapted for connection with a conventional fishing line and has for its primary object to provide, in a manner as hereinafter set forth, a spoon of such class by means of which fish may be attracted to the locality of the hook carried by the line.

A further object of the invention is to provide a spoon for the purpose aforesaid which is constructed in a manner to protect the luminous quality thereof against deterioration in the use of the spoon.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the same:

Figure 1:
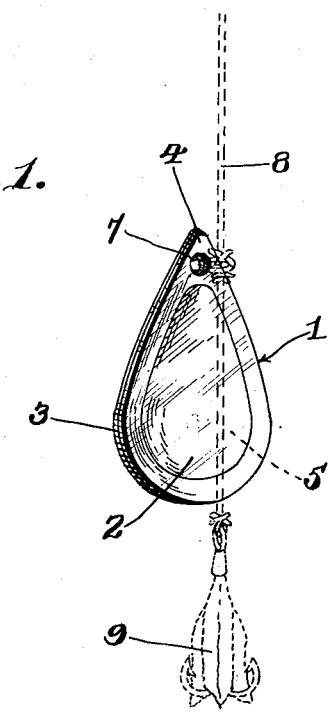
Figure 1 is a perspective view of a spoon in accordance with this invention showing the same in association with a portion of a fishing line.
Figure 3:
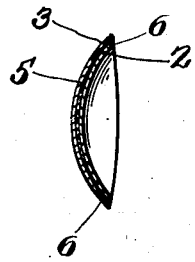
Figure 3 is a transverse section therethrough.
Figure 2:
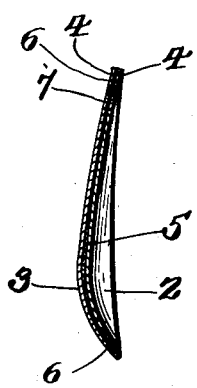
Figure 2 is a longitudinal section through the spoon.

Referring to the drawings in detail, the numeral 1 indicates generally my improved spoon which is formed of a pair of complementary members 2 and 3. The members 2 and 3 are formed of some suitable transparent material, such as celluloid, and are preferably of elongated formation, each having an end portion thereof tapering to a point 4. The members 2 and 3 further are of concavo-convex form and in their assembled relation, the concaved face of one member is positioned against the convexed face of the other member.

Interposed between the members 2 and 3 is a luminous body or substance 5 of film like form. The luminous substance 5 is deposited centrally upon one face of one of the members and after it has dried, the other complementary member is then placed against the substance 5. The members 2, 3 are then securely fastened together by any suitable means, preferably by water proof glue or cement 6. In the embodiment illustrated, a sufficient quantity of the substance 5 has been used to provide for the termination of the luminous substance, peripherally thereof, in spaced relation to the edge faces of the members 2, and 3. The means employed for securing the members 2, 3 together not interfering with the transparent function of said members at the parts thereof between which the substance 5 is interposed.

Extending through each of the members 2 and 3, in spaced relation to the tapered point 4, is an opening 7 by means of which the spoon may be secured to a fishing line, as indicated at 8.

Owing to the transparency of the members 2 and 3, the substance 5 is clearly visible through the members 2 and 3, and owing to the luminous characteristic of the substance 5, the spoon will be visible in dark waters and will provide an attraction to lure fish to the locality of the hook 9 carried by the line 8.

It is thought that the many advantages of a spoon in accordance with this invention will be readily apparent, and although the preferred embodiment of the invention is as illustrated and described, it is to be understood that various changes in the size, shape and arrangement of parts may be resorted to, so long as such changes fall within the scope of the invention as defined in the appended claims.

What I claim is:

1. A fishing spoon comprising, a relatively thin transparent element having a film of luminous material deposited on a side face thereof, a transparent element conforming in size and shape with the first named transparent element positioned against the face of the latter having a film of luminous material thereon, and means for securing said elements together.

2. A fishing spoon comprising, a relatively thin transparent element having a film of luminous material deposited centrally on a side face thereof and terminating peripherally in spaced relation to the peripheral edge of said element, a transparent element conforming in size and shape with the first named transparent element positioned against the face of the latter having the film of luminous material thereon, and means disposed in peripheral relation to said luminous material for securing the transparent elements together.

In testimony whereof, I affix my signature hereto.

ALBERT F. J. LAFKY.